US009124800B2

(12) United States Patent
Chou et al.

(10) Patent No.: US 9,124,800 B2
(45) Date of Patent: Sep. 1, 2015

(54) AUTO BURST IMAGE CAPTURE METHOD APPLIED TO A MOBILE DEVICE, METHOD FOR TRACKING AN OBJECT APPLIED TO A MOBILE DEVICE, AND RELATED MOBILE DEVICE

(71) Applicant: HTC Corporation, Taoyuan County (TW)

(72) Inventors: Peter Chou, Taoyuan County (TW); Drew Bamford, Bellevue, WA (US); John C. Wang, Taoyuan County (TW); Sung-Hao Lin, Taoyuan County (TW); Chung-Ko Chiu, Taoyuan County (TW); Li-Chun Hsu, Taoyuan County (TW); Jeng-Yu Yeh, Taoyuan County (TW); Micah Shotel, Bellevue, WA (US); Jorge Furuya, Bellevue, WA (US)

(73) Assignee: HTC Corporation, Taoyuan District, Taoyuan (TW)

( * ) Notice: Subject to any disclaimer, the term of this patent is extended or adjusted under 35 U.S.C. 154(b) by 386 days.

(21) Appl. No.: 13/754,897

(22) Filed: Jan. 31, 2013

(65) Prior Publication Data

US 2013/0208127 A1 Aug. 15, 2013

Related U.S. Application Data

(60) Provisional application No. 61/597,851, filed on Feb. 13, 2012.

(51) Int. Cl.
*H04N 5/225* (2006.01)
*H04N 5/232* (2006.01)

(52) U.S. Cl.
CPC ....... *H04N 5/23216* (2013.01); *H04N 5/23212* (2013.01); *H04N 5/23219* (2013.01)

(58) Field of Classification Search
USPC ......... 348/169, 170, 155, 154, 143, 142, 135, 348/94, 64, 49, 14.14, 14.03, 208.14, 220.1, 348/222.1, 236, 238, 267, 352, 396.1, 505, 348/576, 714, 719, 786; 382/103, 154, 158, 382/165, 190, 192; 345/173, 158; 715/764, 715/769, 863
See application file for complete search history.

(56) References Cited

U.S. PATENT DOCUMENTS 6,963,661 B1 * 11/2005 Hattori et al. ................. 382/154
2006/0120569 A1 * 6/2006 Kim et al. ..................... 382/115
(Continued)

FOREIGN PATENT DOCUMENTS

JP 2010145965 A 7/2010
WO 2012005392 A1 1/2012

OTHER PUBLICATIONS

European patent application No. 13000716.4, European Search Report, mailing date: Jul. 3, 2013.
(Continued)

*Primary Examiner* — Jefferey Harold
*Assistant Examiner* — Mustafizur Rahman
(74) *Attorney, Agent, or Firm* — Winston Hsu; Scott Margo

(57) ABSTRACT

The present invention discloses a mobile device, where the mobile device includes an image sensing unit, a touch screen, and a processor. The image sensing unit is configured to receive at least an image of a scene comprising at least an object. The touch screen is configured to display at least an image of a scene and received at least one user input. The processor is configured to identify the object in response to a first user input corresponding to the object is received, determine characteristics of the object, track the object in the scene according to the characteristics of the object, and capture a number of images of the scene according to a motion state of the object. The motion state is determined according to variance of the characteristics of the object in consecutive images received by the image sensing unit.

18 Claims, 9 Drawing Sheets

(56) References Cited

U.S. PATENT DOCUMENTS

| | | |
|---|---|---|
| 2007/0154066 A1 | 7/2007 | Lin |
| 2009/0096871 A1* | 4/2009 | Kuwano et al. ............... 348/169 |
| 2009/0196461 A1* | 8/2009 | Iwamoto ....................... 382/103 |
| 2009/0303336 A1* | 12/2009 | Utsugi ........................ 348/222.1 |
| 2010/0045666 A1* | 2/2010 | Kornmann et al. ........... 345/419 |
| 2010/0066588 A1* | 3/2010 | Chen ............................. 342/109 |
| 2010/0189427 A1 | 7/2010 | Ilya |
| 2010/0232644 A1* | 9/2010 | Hsiao et al. ................... 382/103 |
| 2010/0295795 A1* | 11/2010 | Wilairat ........................ 345/173 |
| 2011/0241991 A1* | 10/2011 | Ogura et al. .................. 345/158 |
| 2011/0283212 A1* | 11/2011 | Warner ......................... 715/769 |

OTHER PUBLICATIONS

European patent application No. 13000716.4, European application filing date: Feb. 12, 2013, European Search Report mailing date: Oct. 11, 2013.

* cited by examiner

AUTO BURST IMAGE CAPTURE METHOD APPLIED TO A MOBILE DEVICE, METHOD FOR TRACKING AN OBJECT APPLIED TO A MOBILE DEVICE, AND RELATED MOBILE DEVICE

CROSS REFERENCE TO RELATED APPLICATIONS

This application claims the benefit of U.S. Provisional Application No. 61/597,851, filed on Feb. 13, 2012 and entitled "Camera Auto Burst for Mobile Device," the contents of which are incorporated herein by reference.

BACKGROUND OF THE INVENTION

1. Field of the Invention

The present invention relates to an auto burst image capture method, a method for tracking an object in a scene and a mobile device, and particularly to an auto burst image capture method that can generate a series of images always focus on an object to satisfy a requirement of a user when the user utilizes auto burst in the mobile device to shoot a series of burst images corresponding to the object automatically.

2. Description of the Prior Art

In the prior art, auto burst in an image capture device can provide the ability to shoot a series of images corresponding to a scene automatically. The image capture device may be a smart phone, tablet, digital camera and/or other portable devices. For example, a series of images corresponding to the scene maybe taken by a camera application installed on a smart phone when a user presses a shutter icon displayed on a touch screen of the smart phone. The scene may comprise one or more objects that the user wishes to record. By taking burst images, the user can capture variation of the object (e.g. motion of the object) within a period of time to increase life fun.

However, the series of images corresponding to the object may not satisfy a requirement of the user because the series of images are out of focus with respect to the object when the user utilizes auto burst in the camera to shoot the series of images corresponding to the object automatically. Thus, the user maybe unhappy to utilize auto burst in the camera.

SUMMARY OF THE INVENTION

An embodiment provides an auto burst image capture method applied to a mobile device comprising a touch screen. The auto burst image capture method comprising: receiving a first user input corresponding to an object in a scene from the touch screen; determining characteristics of the object corresponding to the first user input; tracking the object in the scene according to the characteristics of the object; receiving a second user input for capturing at least an image of the scene; determining a motion state of the object according to the characteristics of the object; and capturing a number of images of the scene according to the motion state of the object.

Another embodiment provides a method for tracking an object in a scene applied to a mobile device comprising a touch screen, the method comprising: an input command for locking an object in a scene displayed on the touch screen; identifying and determining characteristics of the object corresponding to the input command; determining at least one main point corresponding to the object according to the characteristics of the object; determining at least one side point corresponding to the object within a region nearby the object according to the characteristics of the object; determining motion of the object according to motion of the main point and the side point; determining whether the object is missing in response to a portion of the main point and the side point is missing over a first predetermined time; and searching the object in the scene in response to the object is determined as missing.

Another embodiment provides a mobile device. The mobile device includes an image sensing unit configured to receive at least an image of a scene comprising at least an object; a touch screen configured to display at least an image of a scene and received at least one user input; and a processor, configured to identify the object in response to a first user input corresponding to the object is received, determine characteristics of the object, track the object in the scene according to the characteristics of the object, and capture a number of images of the scene according to a motion state of the object; wherein the motion state is determined according to variance of the characteristics of the object in consecutive images received by the image sensing unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
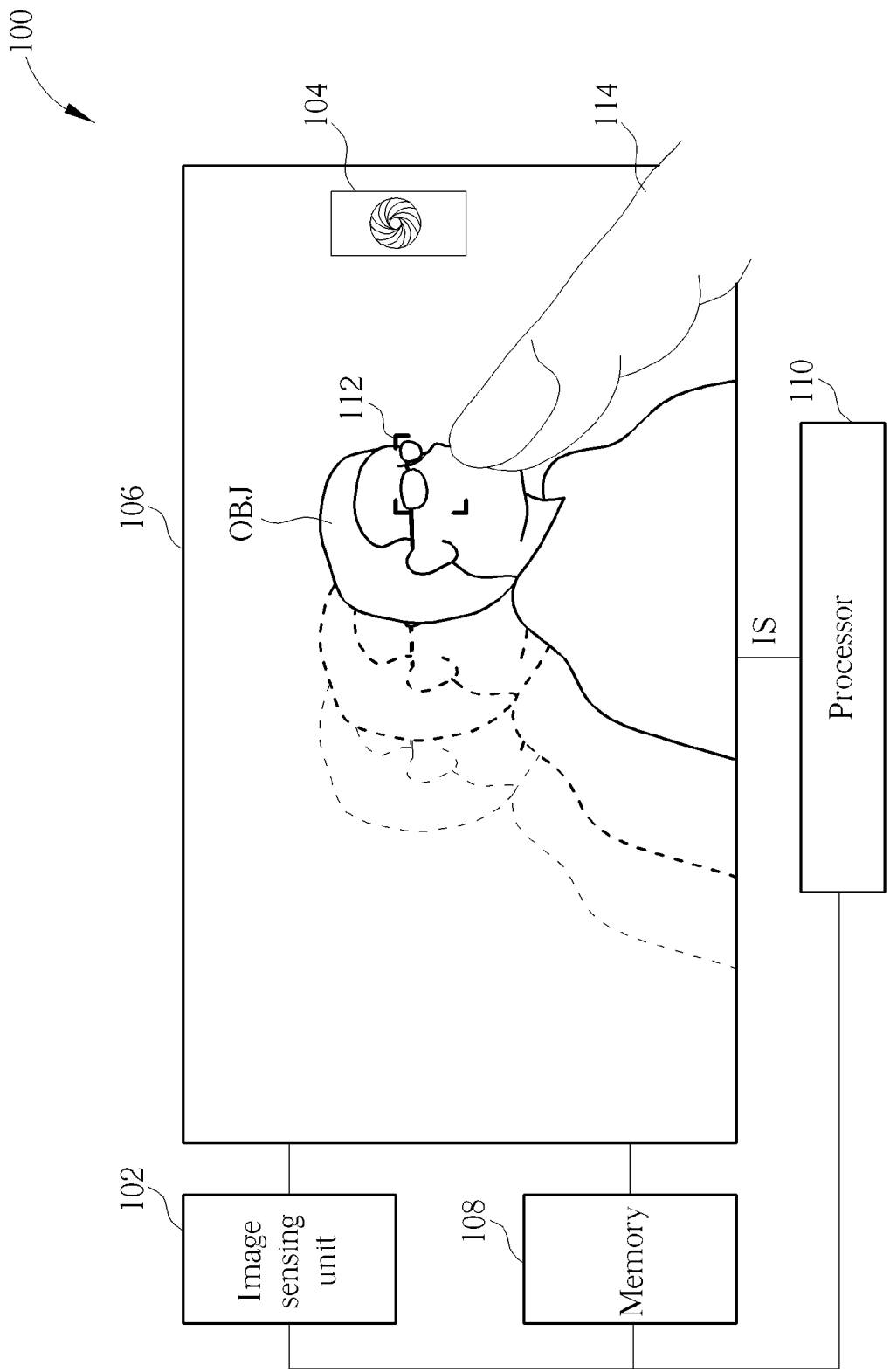
FIG. 1 is a diagram illustrating a mobile device according to an embodiment.

Please refer to FIG. 1. FIG. 1 is a diagram illustrating a mobile device 100 according to an embodiment of the invention. As shown in FIG. 1, the mobile device 100 comprises, among others, an image sensing unit 102, a touch screen 106, a memory 108, and a processor 110. The image sensing unit 102 is configured to capture one or more images of a scene. The scene may comprise one or more objects, or even none. The touch screen 106 is configured to display preview of images received by the image sensing unit 102 and provide as a user interface for receiving user inputs. In the embodiment of the invention, at least a shutter icon 104 is provided on the touch screen 106 for controlling image capture operation of the mobile device 100. The touch screen 106 can also receive other types of user inputs such as tap or multi-finger gesture for controlling the display of preview images. For example, the user may tap on an object OBJ displayed to set and lock focus to the object OBJ. A visual indicator 112 may be displayed on the touch screen 106 to inform the user that the object OBJ is locked. Yet in other example, the user may use two fingers to zoom-in or zoom-out the scene.

The processor 110 is configured to receive and process images received by the image sensing unit 102, provide preview images to the touch screen 106, and store images captured in response to user inputs to the memory 108. The processor 110 is also configured to receive commands corresponding to the user inputs from the touch screen 106 and process the commands accordingly. For example, in response to the user presses or taps the shutter icon 104, the processor 110 would execute an image capture command to encode and store corresponding images. In response to the user input is a tap to the object OBJ, the processor 110 would execute an object lock command to lock and track the object OBJ. The processor 110 may execute the object lock command by finding characteristics of the object OBJ, tracking the object OBJ according to its characteristics and setting focus to the object OBJ. In an embodiment of the invention, the processor 110 may be an image signal processor or any other suitable types of processing units capable to process images. Please note that the processor 110 may be implemented by hardware, software and/or combination of above, and the processing may be configured to execute program codes configured to implement functions disclosed herein. The memory 108 is configured to store images corresponding to image capture command, and the images may be stored in an encoded format such as JPEG.

In the present invention, an auto bust of image capture may be implemented by tracking a locked object OBJ and determining motion of the locked object OBJ. In the case that the locked object OBJ is in a moving state, a series of burst images are automatically captured in response to the user taps the shutter icon 104. On the other hand, if the locked object OBJ is in still state, a single image is captured. The benefit of the auto burst image capture method of the present invention is that user needs not determine which timing is best to capture the best photo he/she desires, or worry about the photo might get fuzzy if he/she is shooting an object in motion. By automatically capturing multiple images of a moving object, user may review and select photos he/she likes at a later time and thus is able to preserve precious moments. To lock and track the object OBJ efficiently, the processor 110 is configured to identify the object OBJ corresponding to the user input, determining characteristics of the object OBJ, determining motion variance of the object OBJ between consecutive images and tracking the object OBJ according to the motion variance.

The processor 110 may identify an object OBJ by face detection, edge detection, feature extraction and/or other methods known in the art. Once the object OBJ is identified, feature points of the object OBJ are then determined for tracking. Feature points may comprise one or more main points directly relevant to the object OBJ and one or more side points, which may or may not be part of the object OBJ, within an area nearby the object OBJ for supporting tracking of the object OBJ. The main points are generally fixed, however the side points can be dynamically added or removed depending on changes of scene conditions. The main points and the side points are selected to have significant different characteristics. For example, in the case that the main points and side points are selected by color, they should have distinct color values so that these points would not be confused with each other. In one embodiment of the invention, if the object OBJ to be locked is a person's face, the main points are selected from the face region, such as eye area, teeth area, etc. The side points can be selected from hair area, shoulder area, neck area, etc. The feature points may be selected as small blocks with size M×N pixels. The size can also be variable with respect to the selected areas having specific shapes. For example, if an eye area is selected as feature points, the size of this feature points may be determined by the actual size of the eye area. As described above, the feature points should have distinct characteristics, for example, color variance in between features points should be larger than a threshold value. Preferably, the feature points should be distinct from other background regions of the scene to improve tracking precision. In another embodiment of the invention that the feature points are selected by shape or edge, each of them should have distinct shapes and/or size. The number of feature points may be predetermined or dynamically determined according to object OBJ being locked. For example, if the object OBJ being locked has few distinct features, the number of the feature points may be adjusted to the maximum distinct features can be found with respect to the object OBJ.

Once the object OBJ is identified and the feature points are determined, the object OBJ would be tracked by the motion of the feature points. To determine to motion of each feature point, the positions of the feature points in consecutive images are determined. Please note that to reduce the computation load and improve performance, the processor 110 may perform these operations on preview images rather than the full resolution images so as to speed up processing. For a given feature point in consecutive N images over a period of time, the motion variance is calculated with respect to each image and can be accumulated to illustrate motion over that period of time. The overall motion variance of the object OBJ is determined according to the combination of the motion variances of all feature points. In one embodiment of the invention, the motion variances of main points are given higher importance, i.e. larger weight while the motion side points are given less importance (less weight) or can be ignored. The motion variance of the object OBJ can be determined by average weighted-sum of the feature points, weighted sum of the feature points and/or other combinations. In another embodiment, the overall motion variance can be determined according to accumulation of motion variance with respect to images over a period of time. In response to the overall motion variance is below a first threshold, the object OBJ is determined as in still state. In response to the overall motion variance is above a second threshold, the object OBJ is determined as in moving state.

As described above, in response to a user input is received for capturing images of the scene, the motion state of the locked object OBJ is determined according to motion variance. And in response to the locked object OBJ is in still state, the processor 110 would capture a single image, then encode and save the image into memory 108. In response to the locked object OBJ is in motion state, the processor 110 would automatically capture a series of burst images, then encode and save the series of burst images into the memory 108. The number of the series of burst images can be predetermined or predefined by user. In one embodiment of the invention, the mobile device 100 may run in two mode of image capture: normal mode and auto burst mode. In normal mode, the processor 110 would capture only single image in response to the user input as received from the shutter icon 104 is a single capture command (for example single short tap on the shutter icon 104). In auto burst mode, the processor 110 would capture either single image or multiple images according to the motion state in response to a single user input received from the shutter icon 104. Please note that the image capture command may also be received in other form, such as a user input from a hardware shutter key.

During the tracking of the locked object OBJ, a first time window is opened in response to one of the featuring points is missing. During the first time window, the processor 110 would search and try to recover the missing feature point. In one embodiment of the invention, if the missing feature point is a side point and cannot be recovered after the first time window is expired, the missing side point can be cancelled and the processor 110 may select a new side point. In another embodiment of the invention, if the number of missing feature points is above a predetermined number or a predetermined percentage and cannot be recovered over a second time window, the object OBJ is determined as missing and thus released from locking. Particularly, if most or all of the main points are missing and cannot be recovered, the object OBJ is determined as missing. If most of the main points are still in track but most of the side points are missing, the current side points can be canceled and new side points can be selected. Yet in another embodiment of the invention, a feature point may be canceled due to its motion variance is way too different from other feature points. For example, if the motion variance of a feature point is above or below the average motion variance of all feature points over a predetermined threshold, the feature point may be canceled. A feature point having too different motion variance may suggest that the feature point is not related to the object OBJ anymore and thus is not a good candidate for tracking the object OBJ.

Figure 2:
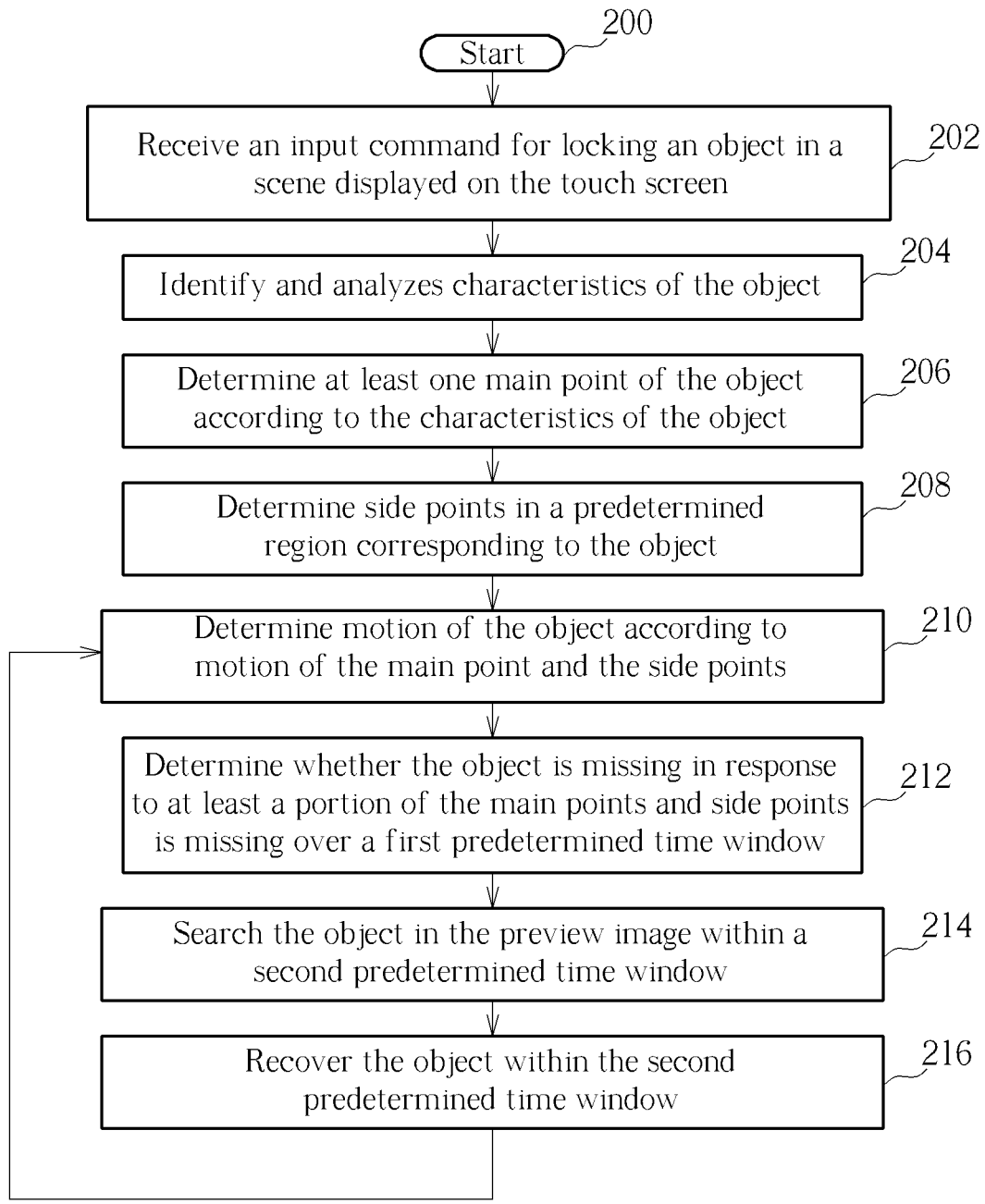
FIG. 2 is a flowchart illustrating a tracking image method applied to a mobile device according to another embodiment.

Next please refer to FIG. 2, which is a flowchart illustrating an object tracking method applied to a mobile device according to another embodiment. The method in FIG. 2 is illustrated using the mobile device 100 in FIG. 1. Detailed steps are as follows:

Step 200: Start.

Step 202: Receive an input command IS for locking an object OBJ in a scene displayed on the touch screen 106.

Step 204: Identify and analyzes characteristics of the object OBJ.

Step 206: Determine at least one main point of the object OBJ according to the characteristics of the object OBJ.

Step 208: Determine side points in a predetermined region corresponding to the object OBJ.

Step 210: Determine motion of the object OBJ according to motion of the main point and the side points.

Step 212: Determine whether the object OBJ is missing in response to at least a portion of the main points and side points is missing over a first predetermined time window.

Step 214: Search the object OBJ in the preview image within a second predetermined time window.

Step 216: Recover the object OBJ within the second predetermined time window, go to Step 210.

In Step 202, as shown in FIG. 1, the input command IS is received by the touch screen 106 sensing a finger of a user touching the object OBJ within the scene displayed on the touch screen 106 of the mobile device 100. In Step 204, the processor 110 can use color characteristics or other characteristics (e.g. edge, face, feature point, or shape of the object OBJ) of the object OBJ. As shown in FIG. 1, the object OBJ is represented on the touch screen 106 by a visual indicator (for example, a rectangle hint). But, the present invention is not limited to the visual indicator being a rectangle. In addition, the processor 110 controls the image sensing unit 102 to focus on the object OBJ. The processor 110 can also track motion of the object OBJ displayed on the touch screen 106.

In Step 206, the processor 110 determines the main points of the object OBJ according to the analyzed characteristics of the locked object OBJ. For example, in response to the main points correspond to different color regions of the object OBJ, the characteristics of the main points may be luminance or edge of each color regions.

In Step 208, in addition to the main points, one or more side points may be added for improving tracking precision of the object OBJ. The side points may be selected from a region of predetermined size nearby the object OBJ. By analyzing the object OBJ and the background corresponding to the object OBJ, some side points with variances larger than a threshold value to the main points can be found and selected. That is to say, the side points have distinguishable characteristics to the characteristics of the main points, and each of the side points is different from others. For example, if the main points are selected by colors of the object OBJ, one of the side points can be a relative brilliant region in contrast to the object OBJ in the background, where color of the relative brilliant region is different from colors of the main points. In addition, characteristics of the main points and the side points can be adjusted to improve the tracking ability of the main point according to environmental changes surrounding the object OBJ (for example, light condition).

In Step 210, the processor 110 can monitor motions of the main points and the side points to determine motion of the object OBJ. That is to say, the processor 110 can utilize relative motion between the main points and the side points to determine the motion of the object OBJ.

In Step 212, if a portion of the main points and side points disappears more than the first predetermined time, the processor 110 determines that the object OBJ is missing. The object OBJ can be determined as missing if most of the main points are missing, or if few main points and most of the side points are missing, even all the main points and side points are missing. The present invention is not limited to any combination described above, and the combination can be adjusted according to actual requirement. In Step 214, the processor 110 searches the object OBJ within the second predetermined time, where the image sensing unit 102 can rectify tracking error and recover to focus on the object OBJ when the object OBJ appears again within the second predetermined time. The processor 110 may search the object OBJ by finding the missing main points and/or side points. In some embodiment of the present invention, if only side points are missing, the processor 110 may replace the missing side points with new side points.

Figure 3:
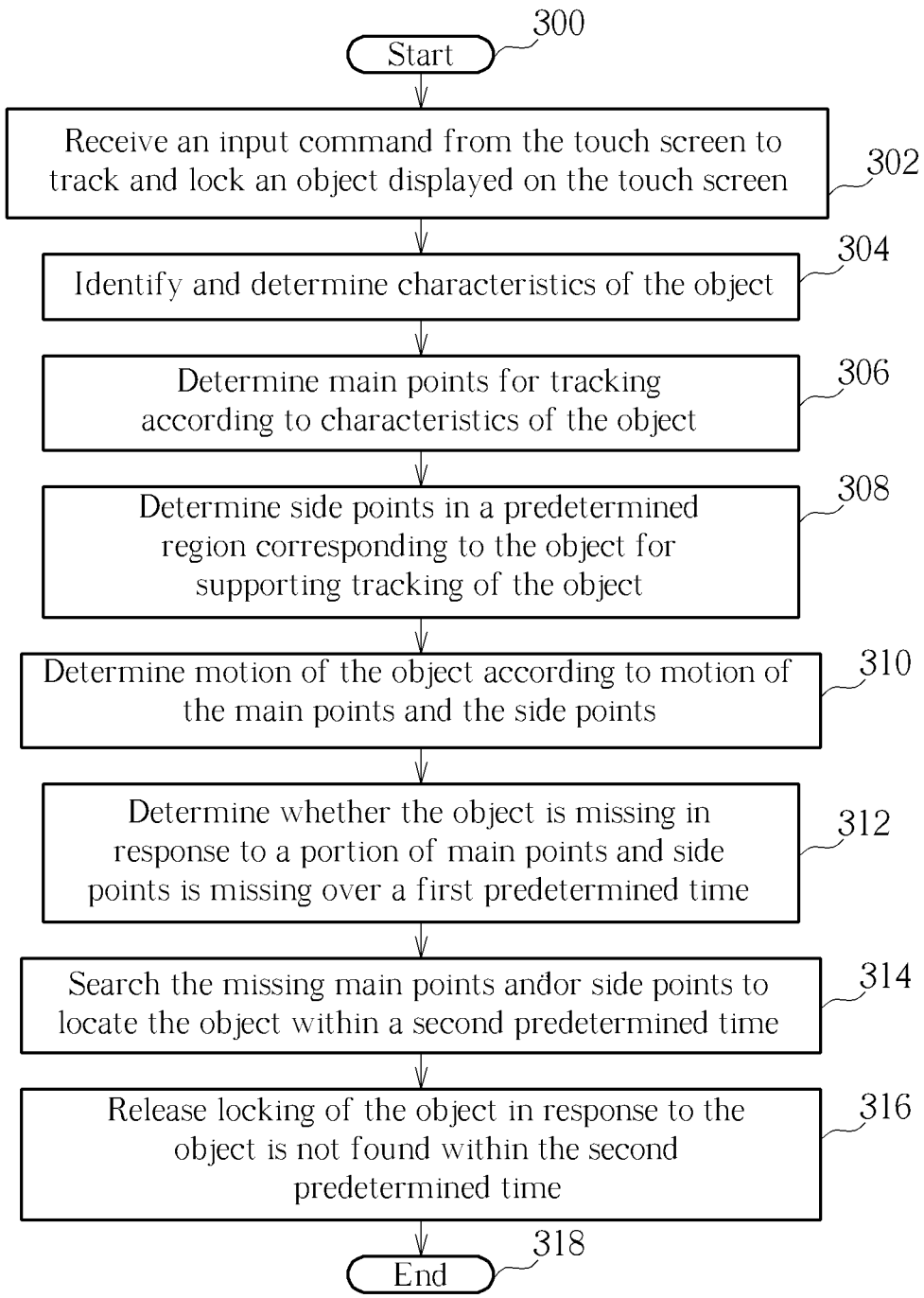
FIG. 3 is a flowchart illustrating a tracking image method applied to a mobile device according to another embodiment.

Please refer to FIG. 3. FIG. 3 is a flowchart illustrating an object tracking method applied to a mobile device according to another embodiment. The method in FIG. 3 is illustrated using the mobile device 100 in FIG. 1. Detailed steps are as follows:

Step 300: Start.

Step 302: Receive an input command IS from the touch screen 106 to track and lock an object OBJ displayed on the touch screen 106.

Step 304: Identify and determine characteristics of the object OBJ.

Step 306: Determine main points for tracking according to characteristics of the object OBJ.

Step 308: Determine side points in a predetermined region corresponding to the object OBJ for supporting tracking of the object OBJ.

Step 310: Determine motion of the object OBJ according to motion of the main points and the side points.

Step 312: Determine whether the object OBJ is missing in response to a portion of main points and side points is missing over a first predetermined time.

Step 314: Search the missing main points and/or side points to locate the object OBJ within a second predetermined time.

Step 316: Release locking of the object OBJ in response to the object OBJ is not found within the second predetermined time.

Step 318: End.

A difference between the embodiment in FIG. 3 and the embodiment in FIG. 2 is that in Step 316, the processor 110 release locking and tracking of the object OBJ because the object OBJ cannot be found within the second predetermined time. If the missing main points and/or side points remain missing over a period of time, it may suggest that the object OBJ is moving out of the scene. Thus, the user may select a new object to lock and track. In the embodiment in FIG. 3, the user does not need to touch the touch screen 106 again to release locking and tracking of the object OBJ since the object OBJ has already outside of the scene displayed the touch screen 106. In addition, subsequent operational principles of the embodiment in FIG. 3 are the same as those of the embodiment in FIG. 2, so further description thereof is omitted for simplicity.

Figure 4:
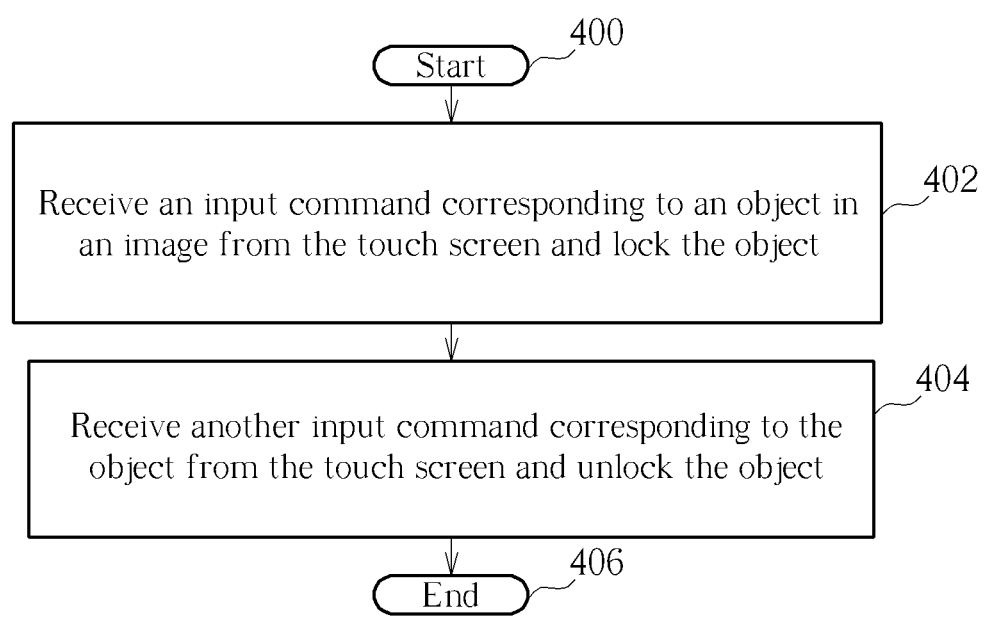
FIG. 4 is a flowchart illustrating a tracking image method applied to a mobile device according to another embodiment.

Please refer to FIG. 4. FIG. 4 is a flowchart illustrating an object tracking method applied to a mobile device according to another embodiment. The method in FIG. 4 is illustrated using the mobile device 100 in FIG. 1. Detailed steps are as follows:

Step 400: Start.

Step 402: Receive an input command IS corresponding to an object OBJ in an image from the touch screen 106 and lock the object OBJ.

Step 404: Receive another input command IS corresponding to the object OBJ from the touch screen 106 and unlock the object OBJ.

Step 406: End.

In Step 404, another input command is generated by the touch screen 106 sensing the finger 114 of the user touching the object OBJ displayed on the touch screen 106 of the mobile device 100. Upon release lock of the object OBJ, the user can select a new target to lock and track.

Figure 5:
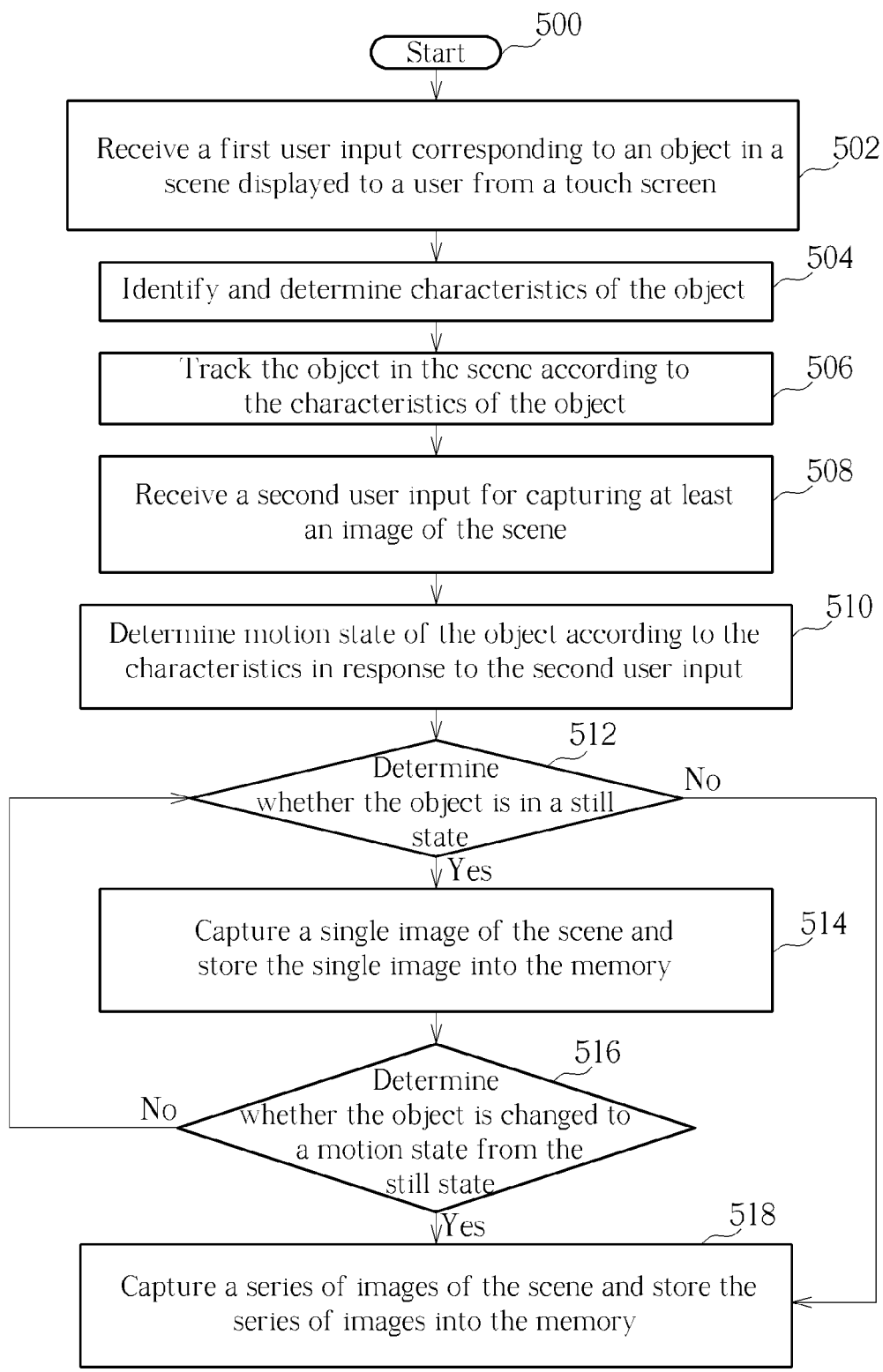
FIG. 5 is a flowchart illustrating an auto burst image capture method applied to a mobile device according to another embodiment.

Please refer to FIG. 5. FIG. 5 is a flowchart illustrating an auto burst image capture method applied to a mobile device according to another embodiment. The method in FIG. 5 can be implemented by the mobile device 100 in FIG. 1. Detailed steps are as follows:

Step 500: Start.

Step 502: Receive a first user input corresponding to an object OBJ in a scene displayed to a user from a touch screen.

Step 504: Identify and determine characteristics of the object OBJ.

Step 506: Track the object OBJ in the scene according to the characteristics of the object OBJ.

Step 508: Receive a second user input for capturing at least an image of the scene.

Step 510: Determine motion state of the object OBJ according to the characteristics in response to the second user input.

Step 512: Determine whether the object OBJ is in a still state; if yes, go to Step 514; if no, go to Step 518.

Step 514: Capture a single image of the scene and store the single image into the memory 108.

Step 516: Determine whether the object OBJ is changed to a motion state from the still state; if yes, go to Step 518; if no, go to Step 512.

Step 518: Capture a series of images of the scene and store the series of images into the memory 108.

In Step 502, with reference to FIG. 1, the first user input is received by the touch screen 106 sensing the finger 114 of the user touching the object OBJ displayed on the touch screen 106 of the mobile device 100. In Step 504, the processor 110 identifies and determines the characteristics of the object OBJ (e.g. a color region, edge, face, feature points, or shape of the object OBJ). The object OBJ can be identified by face detection, edge detection, feature extraction and/or other methods known in the art. In another embodiment of the present invention, the characteristics of the object OBJ can be determined by a requirement of the user. In Step 506, the object OBJ is tracked according to its characteristics. The processor 110 may analyze the characteristics of the object OBJ, and select feature points that can be used to represent the object OBJ for tracking. The feature points may comprise main points directly relevant to the object OBJ and/or side points which are not part of the object OBJ. In Step 508-510, a second user input is received for capturing at least an image of the scene from, for example the touch screen 106 or other user interface such as a hardware shutter key. Upon receiving the second user input, the processor 110 determines a motion state of the object OBJ according to the characteristics of the object OBJ.

In Step 512 to Step 514, the processor 110 may determine the motion state by determining motion variance of the feature points in consecutive images. If the motion variance from one image to another (a next one, or over a predetermined number of consecutive images) is below a first threshold, the object OBJ is determined as in still state. If not, the object OBJ is determined as in moving state. In another embodiment of the invention, the motion variance of the object OBJ can be accumulated over a first predetermined period of time. In response to the object OBJ is in still state, the processor 110 captures a single image of the scene comprising the object OBJ and stores the single image in the memory 108. The single image may be encoded prior to storing to the memory 108. Then in Step 516, the processor 110 can determine that the object OBJ is changed to the motion state from the still state if large motion variance of the object OBJ within a second predetermined time is greater than a second predetermined threshold, where the second predetermined threshold can be set according to a size of the object OBJ, for example half of the size of the object OBJ. But, the present invention is not limited to the second predetermined threshold being set according to the size of the object OBJ. Following in Step 518, the processor 110 captures a series of burst images of the scene comprising the object OBJ and stores the series of images in the memory 108 in response to the object OBJ is in moving state, or changed from still state to moving state. In addition, generally speaking, the second predetermined threshold is usually set smaller than the first predetermined threshold.

In Step 512 to Step 518, the processor 110 captures a series of images corresponding to the object OBJ and stores the series of burst images in the memory 108 in response to the processor 110 determines that the object OBJ is in the motion state according to motion variance of the object OBJ being greater than the first predetermined threshold, where motion variance of the object OBJ can be accumulated over the first predetermined time.

In addition, how the processor 110 may identify and lock the object OBJ according to the methods described in to FIG. 2, FIG. 3, and FIG. 4, so further description thereof is omitted for simplicity.

Figure 6:
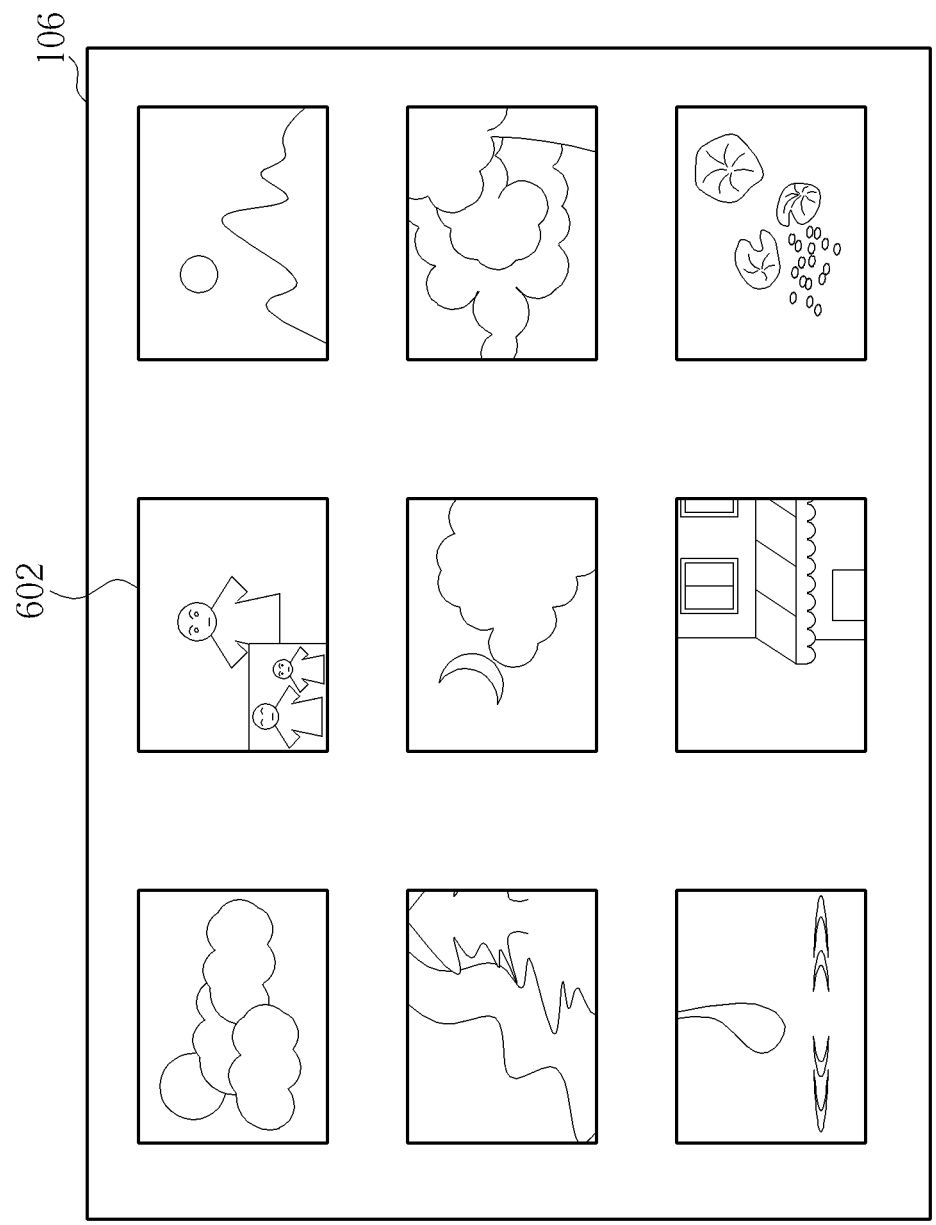
FIG. 6 is a diagram illustrating image icons displayed on the touch screen corresponding to images stored in the memory.
Figure 7:
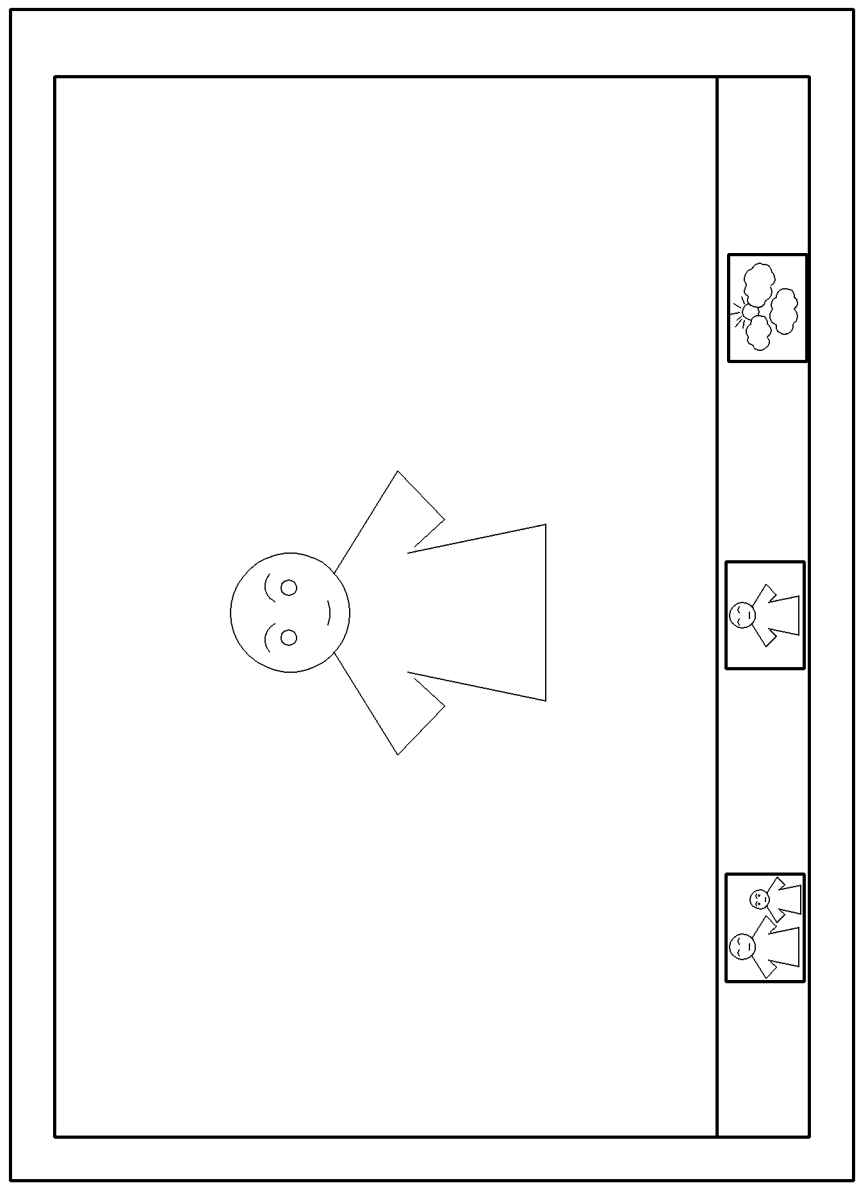
FIG. 7 is a diagram illustrating a list view of all images of the single representative image icon being shown in thumbnails when the user touches the single representative image icon.

Please refer to FIG. 6. FIG. 6 is a diagram illustrating image view displayed on the touch screen 106 corresponding to burst images stored in the memory 108. As shown in FIG. 6, images captured in auto burst mode are grouped together, e.g. a representative image 602 of the series of burst images is shown with a smaller icon at a corner. That is to say, the user would not see all images in photo preview, instead represented by the representative image 602. As shown in FIG. 7, when the user touches the representative image 602 for viewing all of the series of burst images, a list view of all images are shown in thumbnails at bottom of the touch screen 106 and the representative image 602 is shown at the top of the touch screen 106. As shown in FIG. 7, the user may slide through the bottom list to see other images of the series of burst images. In another embodiment of the present invention, the top of the touch screen 106 can be used for displaying all images of the series of burst images in slide show.

Figure 8:
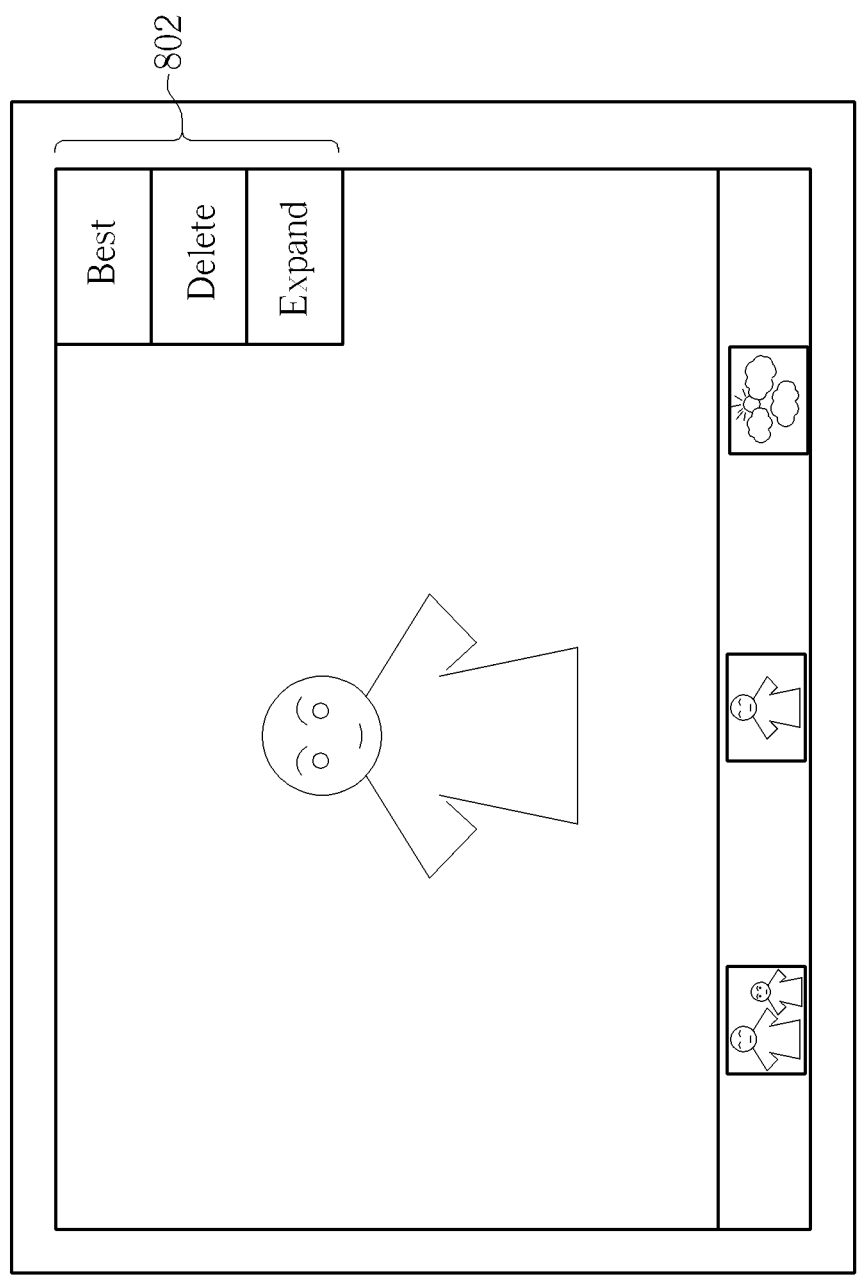
FIG. 8 is a diagram illustrating a hidden option menu being triggered to appear when the user touches a certain image of the single representative image icon for full view.
Figure 9:
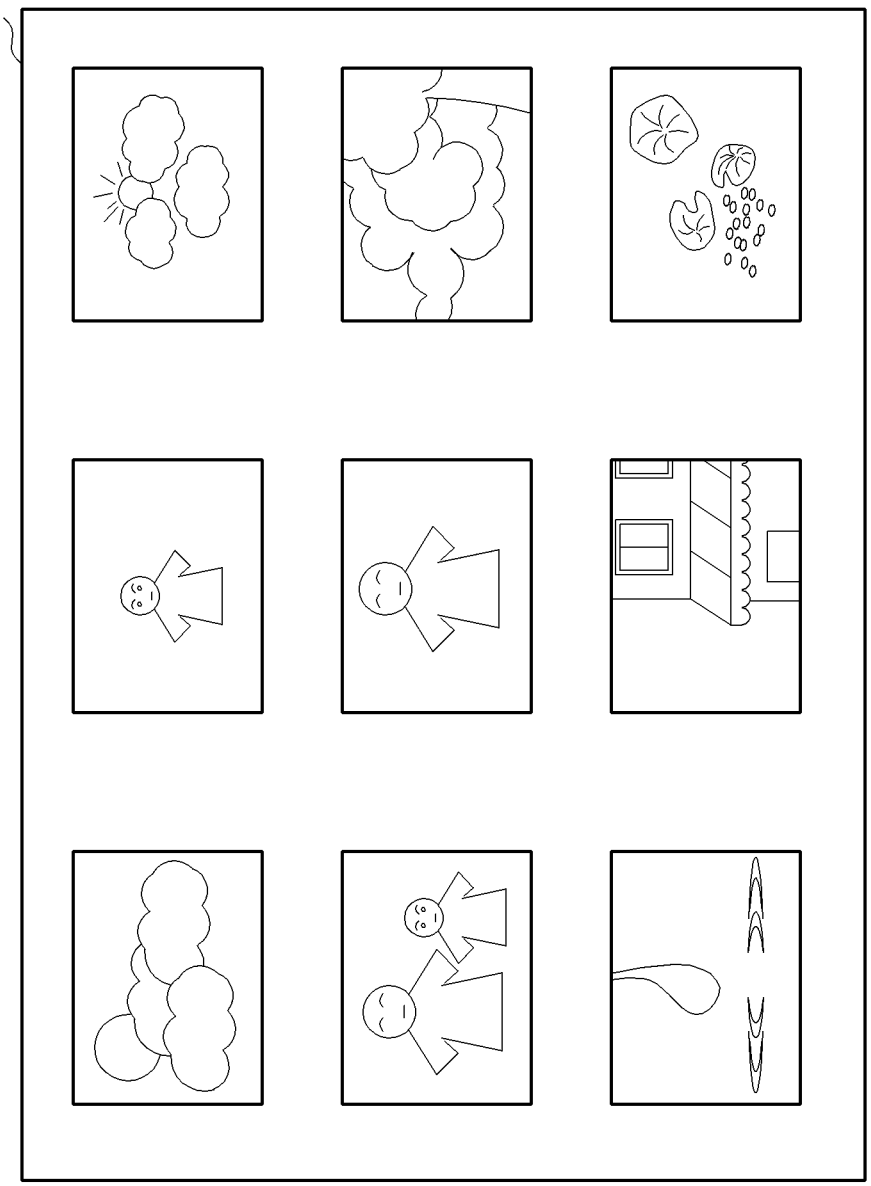
FIG. 9 is a diagram illustrating the single representative image icon being deformed and restored as individual images when the user selects expand option.

When the user touches a certain image of the series of burst images for full view, a hidden option menu 802 can be triggered to appear (as shown in FIG. 8). As shown in FIG. 8, in one embodiment of the present invention, the option menu 802 includes some options, for example best, delete and expand. When the user selects best option, the representative image 602 is change to be the image selected by the user in full view, or to delete other images of the series of burst images from the memory 108. When the user selects delete option, the image selected by the user is deleted from the series of burst images. When the user selects expand option, the series of burst images are deformed and restored as individual images. Thus, the representative image 602 no longer exists and the user may see all images separately in photo preview (as shown in FIG. 9). In another embodiment of the present invention, if images captured in auto burst mode are less than a predetermined number, the images would not be grouped together and saved individually.

To sum up, the present invention provides a novel approach to lock and track an object in a scene automatically as selected by user. In one embodiment of the present invention, the processor can utilize main points and side points corresponding to the object to determine motion of the object and thus to determine whether to capture a single image or a series of burst images in response to a capture input is received. Therefore, compared to the prior art, the present invention can satisfy a requirement of the user because the series of images are generated by the mobile device always focus on the object when the user utilizes auto burst in the mobile device to shoot a series of images corresponding to the object automatically.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto burst image capture method applied to a mobile device comprising a touch screen, the auto burst image capture method comprising:
   receiving a first user input corresponding to an object in a scene from the touch screen;
   determining characteristics of the object corresponding to the first user input;
   tracking the object in the scene according to the characteristics of the object;
   receiving a second user input for capturing at least an image of the scene;
   determining a motion state of the object according to the characteristics of the object;
   when the motion state of the object is a still state, capturing a single image of the scene; and
   when the motion state of the object is in a moving state, capturing a series of burst images.

2. The auto burst image capture method of claim 1, wherein the motion state of the object is determined as in the still state in response to a motion variance of the object between consecutive images is below a first threshold.

3. The auto burst image capture method of claim 1, wherein the motion state of the object is determined as in the moving state in response to a motion variance of the object between consecutive images is above a second threshold.

4. An auto burst image capture method applied to a mobile device comprising a touch screen, the auto burst image capture method comprising:
   receiving a first user input corresponding to an object in a scene from the touch screen;
   determining characteristics of the object by selecting at least two feature points relevant to the object corresponding to the first user input;
   tracking the object in the scene according to the characteristics of the object;
   receiving a second user input for capturing at least an image of the scene;
   determining a motion state of the object according to the characteristics of the object; and
   capturing a number of images of the scene according to the motion state of the object;
   wherein the feature points have distinct characteristics.

5. The auto burst image capture method of claim 4, wherein the characteristics of the object is selected from one of the following: color, luminance, edge and shape.

6. The auto burst image capture method of claim 1, wherein the determining characteristics of the object further comprising:
   identifying the object corresponding to the first user input in the scene by one of below algorithms: face detection, edge detection and feature extraction;
   selecting at least a main point directly relevant to the object; and
   selecting at least a side point within a region nearby the object;
   wherein the main point and the side point are selected to have distinct characteristics.

7. A method for tracking an object in a scene applied to a mobile device comprising a touch screen, the method comprising:
   an input command for locking an object in a scene displayed on the touch screen;
   identifying and determining characteristics of the object corresponding to the input command;
   determining at least one main point corresponding to the object according to the characteristics of the object;
   determining at least one side point corresponding to the object within a region nearby the object according to the characteristics of the object;
   determining motion of the object according to motion of the main point and the side point;
   determining whether the object is missing in response to a portion of the main point and the side point is missing over a first predetermined time; and
   searching the object in the scene in response to the object is determined as missing.

8. The method of claim 7, further comprising:
   releasing locking of the object in response to the object is not found within a second predetermined time.

9. The method of claim 7, wherein searching the object in the scene further comprising:

searching the portion of main point and side point determined as missing within a second predetermined time.

10. The method of claim 7, wherein the determining whether the object is missing further comprising at least one of the following:
   in response to over a first number of main point is missing, the object is determined as missing;
   in response to over a second number of main point and over a third number of side point is missing, the object is determined as missing.

11. The method of claim 10, further comprising replacing the side point determined as missing with a new side point in response to the side point is missing over a third predetermined time.

12. The method of claim 7, further comprising:
   releasing locking of the object in response to a second input command is received.

13. The method of claim 7, wherein the characteristics of the object is selected from one of the following: color, luminance, edge and shape, and the object is identified by one of below algorithms: face detection, edge detection and feature extraction.

14. A mobile device, the mobile device comprising:
   an image sensing unit configured to receive at least an image of a scene comprising at least an object;
   a touch screen configured to display at least an image of a scene and receive at least one user input; and
   a processor, configured to identify the object in response to a first user input corresponding to the object is received, determine characteristics of the object, track the object in the scene according to the characteristics of the object, track the object according to at least two feature points corresponding to the object having the feature points selected be distinct characteristics, and capture a number of images of the scene according to a motion state of the object;
   wherein the motion state is determined according to variance of the characteristics of the object in consecutive images received by the image sensing unit.

15. The mobile device of claim 14, wherein the motion state of the object is determined according to variance of the feature points in consecutive images over a predetermined time.

16. The mobile device of claim 14, wherein the processor is further configured:
   capture a single image of the scene in response to the object is in a still state; and
   capture a series of burst images of the scene in response to the object is in a moving state.

17. The mobile device of claim 16, wherein the object is determined as in the still state in response to the variance of the characteristics in consecutive images is below a first threshold and the object is determined as in the moving state in response to the variance of the characteristics in consecutive images is above a second threshold.

18. The mobile device of claim 14, the characteristics of the object is selected from one of the following: color, luminance, edge and shape, and the object is identified by one of below algorithms: face detection, edge detection and feature extraction.

* * * * *